(12) United States Patent
Mathys (10) Patent No.: US 11,685,005 B2
(45) Date of Patent: Jun. 27, 2023

(54) SYSTEMS AND METHODS OF REPAIRING A STAMPING DIE

(71) Applicant: Honda Motor Co., Ltd., Tokyo (JP)

(72) Inventor: Logan Tyrel Mathys, DeGraff, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 129 days.

(21) Appl. No.: 17/186,976

(22) Filed: Feb. 26, 2021

(65) Prior Publication Data

US 2022/0274215 A1    Sep. 1, 2022

(51) Int. Cl.
  *G06T 15/10* (2011.01)
  *G06T 7/00* (2017.01)
  *B23P 6/00* (2006.01)
  *B33Y 80/00* (2015.01)

(52) U.S. Cl.
  CPC .............. *B23P 6/00* (2013.01); *G06T 7/001* (2013.01); *G06T 7/0004* (2013.01); *G06T 15/10* (2013.01); *B33Y 80/00* (2014.12)

(58) Field of Classification Search
  CPC ....... B23P 6/00; G06V 20/64; G06F 3/04842; G06K 9/6267; G06T 7/20; G06T 7/0004; G06T 7/001; G06T 15/10; B33Y 80/00
  USPC ................................................. 382/154, 100
  See application file for complete search history.

(56) References Cited

U.S. PATENT DOCUMENTS

| | | | |
|---|---|---|---|
| 5,907,398 A | 5/1999 | Fujino et al. | |
| 8,606,017 B1 * | 12/2013 | Fang | G06K 9/628 |
| | | | 382/149 |
| 2006/0222237 A1 * | 10/2006 | Du | G01N 25/72 |
| | | | 382/152 |
| 2007/0052795 A1 * | 3/2007 | Swanger | G06T 7/155 |
| | | | 348/92 |
| 2017/0312876 A1 * | 11/2017 | DeCore | B24B 19/20 |
| 2018/0221934 A1 * | 8/2018 | Xu | B21D 37/10 |
| 2019/0337177 A1 * | 11/2019 | Alvarez Ponga | G05B 19/404 |
| 2022/0207700 A1 * | 6/2022 | Asaoka | B22D 46/00 |

FOREIGN PATENT DOCUMENTS

| | | | |
|---|---|---|---|
| CN | 104471629 A | | 3/2015 |
| CN | 103305842 B | | 8/2015 |
| CN | 10595542 | * | 9/2016 |

(Continued)

OTHER PUBLICATIONS

YouTube Video of an Augmented Reality Sandbox from Beals Science—posted Jun. 8, 2017; available at https://www.youtube.com/watch?v=bA4uvkAStPc&feature=youtu.be; last visited Jan. 20, 2021.

*Primary Examiner* — Sheela C Chawan
(74) *Attorney, Agent, or Firm* — Armstrong Teasdale LLP (57) ABSTRACT

A system for use in repairing a stamping press die. The system includes an imaging system configured to perform a scan on a pressing surface of the stamping press die, wherein a profile of the pressing surface is determined based on the scan. A computing device is configured to compare the determined profile to a desired profile of the pressing surface, and to generate a repair template based on dimensional variations between the determined profile and the desired profile. A projection system is configured to display the repair template on the pressing surface.

20 Claims, 6 Drawing Sheets

(56) References Cited

FOREIGN PATENT DOCUMENTS

| | | | |
|---|---|---|---|
| CN | 105981087 | A | 9/2016 |
| CN | 106271125 | A | 1/2017 |
| CN | 109201884 | * | 3/2018 |
| JP | 2008064714 | A | 3/2008 |
| JP | 6403446 | B2 | 10/2018 |
| WO | 2008087502 | A1 | 7/2008 |
| WO | 2014140720 | A1 | 9/2014 |
| WO | 2019110024 | A1 | 6/2019 |
| WO | 2019197530 | A1 | 10/2019 |

* cited by examiner

SYSTEMS AND METHODS OF REPAIRING A STAMPING DIE

BACKGROUND

The present disclosure relates generally to stamping presses and, more specifically, to systems and methods of repairing a stamping die with improved accuracy.

A stamping press is used to form parts using a large application of force. A stamping process is often used to form metal components, such as vehicle body panels, from sheet metal. In such processes, a stamping die set is held in the stamping press, and known die sets typically include a fixed die and a moving die or punch. The fixed die remains stationary against a lower section of the stamping press, and the punch is maintained above the fixed die while the press is in its open position. A sheet metal blank is inserted against the fixed die, and the punch is forced against the blank and towards the fixed die, such that the blank is formed into the shape of the die set.

After prolonged use, one or both dies in the set may become damaged. Generally, it is more cost efficient to repair the damaged die than to replace it. The ultimate goal of repairing the damaged die is to refurbish the stamping surface to its original shape. However, because die repairs are typically performed manually, successful completion of the repair is subjectively determined by the associate performing the repair, and the only verification that the stamping surface has been refurbished to its original shape is through stamping a part with the repaired die and performing an analysis on the stamped part. However, producing and analyzing a test part is a time-consuming task that may delay the return of the stamping press to service. In addition, if the results of the analysis determine the die has been repaired unsatisfactorily, the repair and verification process must be repeated, thereby further increasing the delay.

BRIEF DESCRIPTION

In one aspect, a system for use in repairing a stamping press die is provided. The system includes an imaging system configured to perform a scan on a pressing surface of the stamping press die, wherein a profile of the pressing surface is determined based on the scan. A computing device is configured to compare the determined profile to a desired profile of the pressing surface, and to generate a repair template based on dimensional variations between the determined profile and the desired profile. A projection system is configured to display the repair template on the pressing surface.

In another aspect, a system for use in repairing a stamping press die is provided. The system includes an imaging system configured to scan a pressing surface of the stamping press die as work is performed on the pressing surface, wherein a profile of the pressing surface is determined based on the scan. A computing device is configured to compare the determined profile to a desired profile of the pressing surface, generate a repair template based on dimensional variations between the determined profile and the desired profile, and update the repair template based on modifications made to the pressing surface as the work is performed. A projection system is configured to display the repair template on the pressing surface.

In yet another aspect, a method of repairing a stamping press die is provided. The method includes performing a scan on a pressing surface of the stamping press die, and wherein a profile of the pressing surface is determined based on the scan, comparing the determined profile to a desired profile of the pressing surface, generating a repair template based on dimensional variations between the determined profile and the desired profile, and displaying the repair template on the pressing surface.

DETAILED DESCRIPTION

The embodiments described herein relate generally to systems and methods of repairing a stamping die with improved accuracy. The systems described herein include an imaging system that scans a surface of the stamping die to determine the current topography of the die surface. The systems compare the scanned current topography to a desired topography, and a projection system then projects an overlay image onto the die surface that visually identifies locations where the current topography differs from the desired topography. In some embodiments, the projected image may be updated in real time as work is performed on the stamping die. Accordingly, a technician performing the work may be provided with visual feedback and guidance for performing the work in an accurate and precise manner. The system also provides instant verification of a successful repair, thus facilitating shortening a duration that the stamping die is removed from service without a need for a secondary verification techniques.

Figure 1:
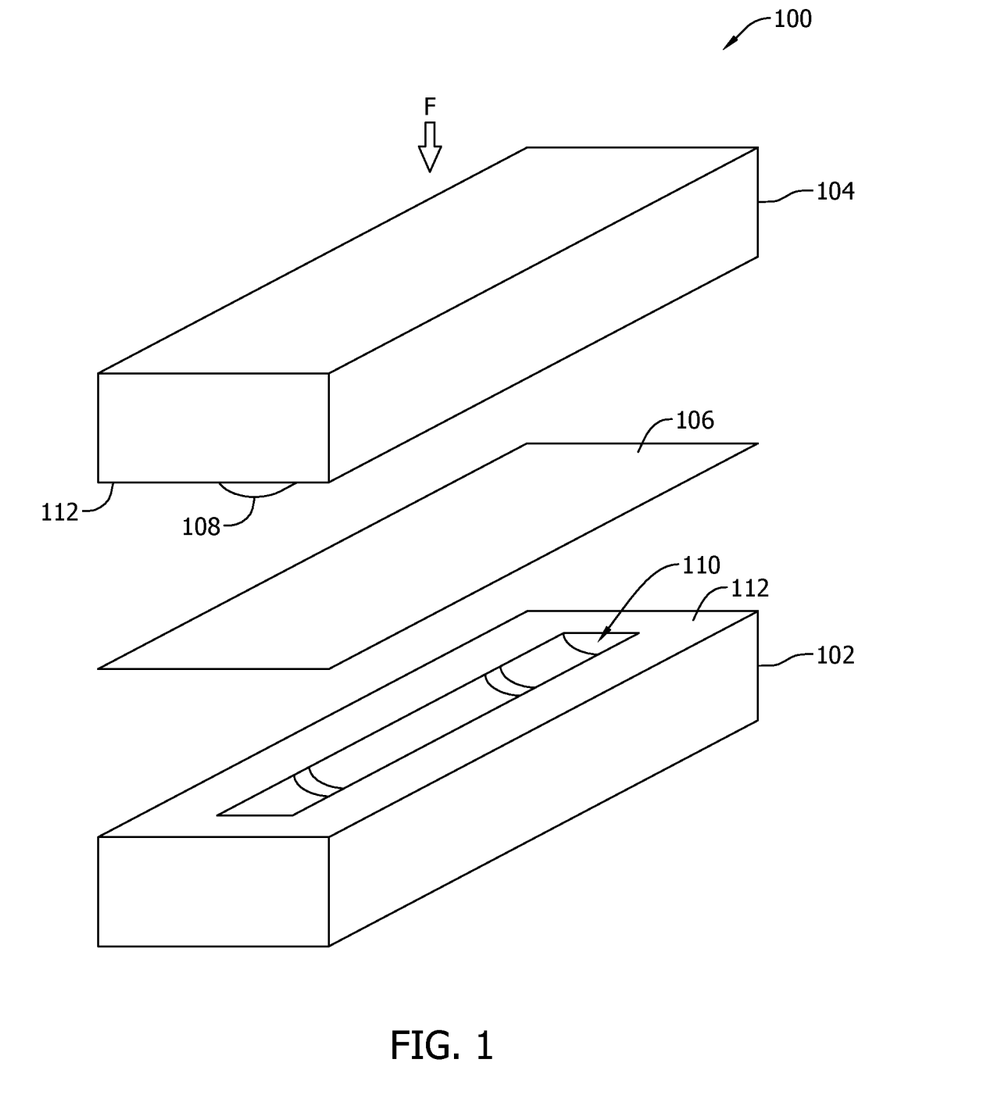
FIG. 1 is a perspective view of an exemplary stamping press in an open position.

FIG. 1 is a perspective view of an exemplary stamping press 100 in an open position. In the exemplary embodiment, stamping press 100 includes a first stamping press die 102 and a second stamping press die 104 that are spaced apart from each other. A blank 106 of sheet metal is inserted between first and second stamping dies 102 and 104. In the exemplary embodiment, first die 102 includes a projection 108 formed thereon, and second die 104 includes a recess 110 having a shape that is substantially complementary to the shape of projection 108. Each die 102 and 104 includes a pressing surface 112 that is oriented to contact blank 106, and contoured to define a final shape of a pressed part (not shown). Accordingly, during use, a force F drives first die 102 towards second die 104 such that blank 106 is sandwiched therebetween, thus enabling blank 106 to be deformed to the desired shape for the pressed part by the shape of projection 108 and recess 110.

Figure 2:
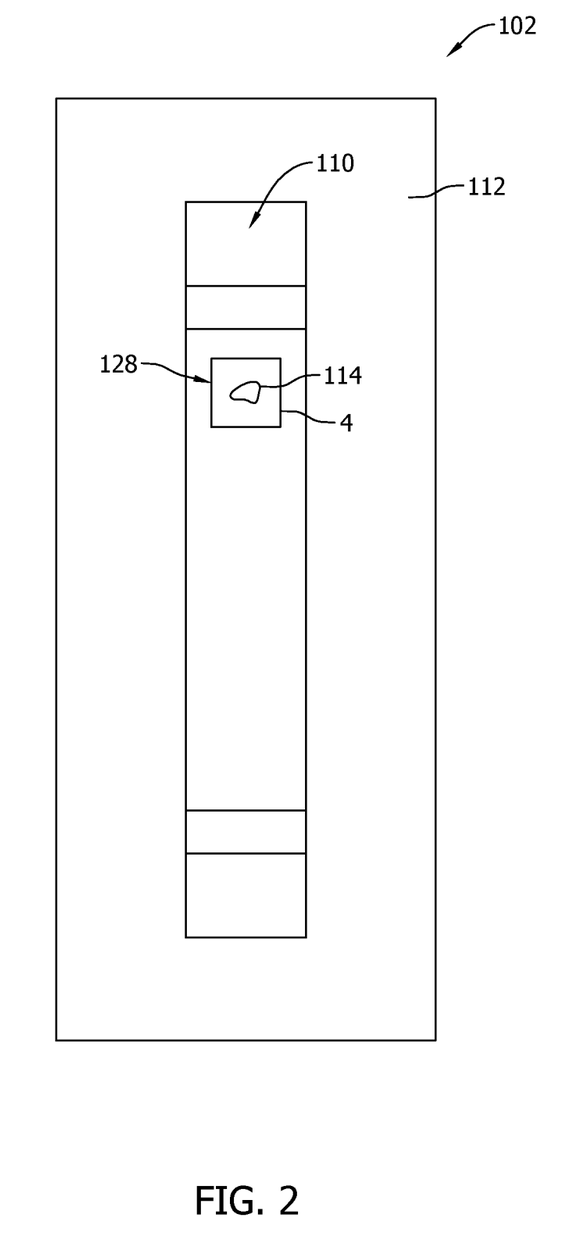
FIG. 2 is a block diagram of an exemplary system for use in repairing a stamping press die.

FIG. 2 is a top view of first stamping press die 102. In the exemplary embodiment, pressing surface 112 is defined by various surface features that define the final shape of the pressed part. Example surface features include, but are not limited to only including, sharp edges, contoured surfaces, embossing features, and the like. In some embodiments, one or more surface features on die 102 and/or die 104, as described below, may become damaged (e.g., cracked, dented, etc) after prolonged use. Damage 114 may result in the manufacture of non-compliant pressed parts by stamping press 100. Accordingly, in some embodiments, die 102 may be repaired with an additive manufacturing technique, such as a welding process.

Figure 3:
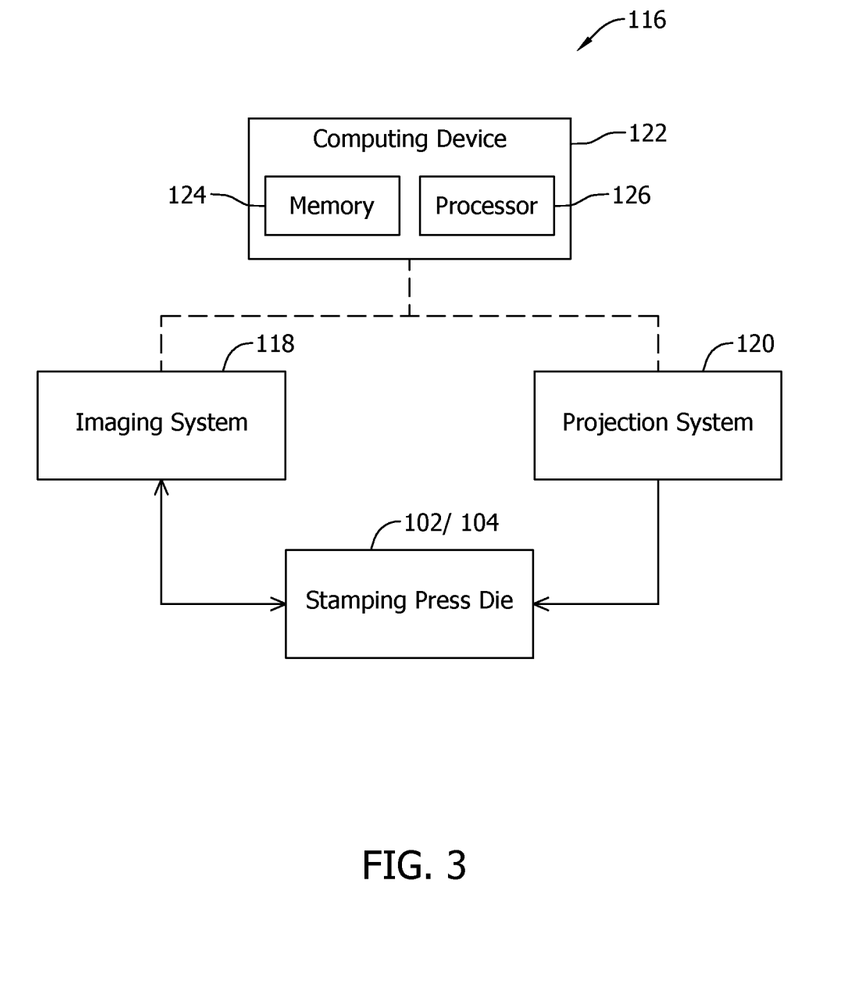
FIG. 3 is a top view of a first stamping press die shown in FIG. 1.

FIG. 3 is a block diagram illustrating an exemplary system 116 for use in repairing stamping press die 102. In the exemplary embodiment, system 116 includes an imaging system 118 that performs one or more scans on pressing surface 112 (shown in FIG. 2) of die 102 to determine a profile thereof. Imaging system 118 may be any imaging device that enables system 116 to function as described herein. In one exemplary embodiment, imaging system 118 includes at least one depth sensor (not shown) such as a one time-of-flight camera sensor. The camera sensor emits a light signal, and determines a distance of an obstruction from the camera sensor based on a time it takes for a return signal, derived from the emitted light signal, to be received at the camera sensor. Accordingly, the profile generated by imaging system 118 provides a detailed dimensional survey of the surface features on pressing surface 112.

System 116 also includes a projection system 120 that projects an image onto die 102. As will be described in more detail below, the image projected onto die 102 is based on an analysis of the profile determined by imaging system 118. For example, the determined profile may be compared to a desired profile of pressing surface 112, and the image generated may be based on the comparison and then projected onto pressing surface 112 to provide a repair template that facilitates guiding repair of die 102.

A computing device 122 communicates with imaging system 118 and projection system 120. In the exemplary embodiment, computing device 122 analyzes the profile data obtained by imaging system 118, and provides image data to projection system 120 based on the analysis. Computing device 122 includes a memory 124 and a processor 126, including hardware and software, coupled to memory 124 for executing programmed instructions. Processor 126 may include one or more processing units (e.g., in a multi-core configuration) and/or include a cryptographic accelerator (not shown). Computing device 122 is programmable to perform one or more operations described herein by programming memory 124 and/or processor 126. For example, processor 126 may be programmed by encoding an operation as executable instructions and providing the executable instructions in memory 124.

Processor 126 may include, but is not limited to, a general purpose central processing unit (CPU), a microcontroller, a microprocessor, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 126, cause processor 126 to perform at least a portion of the functions described herein. The above examples are for example purposes only, and thus are not intended to limit in any way the definition and/or meaning of the term processor.

Memory 124 is one or more devices that enable information such as executable instructions and/or other data to be stored and retrieved. Memory 124 may include one or more computer-readable media, such as, without limitation, dynamic random access memory (DRAM), synchronous dynamic random access memory (SDRAM), static random access memory (SRAM), a solid state disk, and/or a hard disk. Memory 124 may be configured to store, without limitation, executable instructions, operating systems, applications, resources, installation scripts and/or any other type of data suitable for use with the methods and systems described herein.

Instructions for operating systems and applications are located in a functional form on non-transitory memory 124 for execution by processor 126 to perform one or more of the processes described herein. These instructions in the different implementations may be embodied on different physical or tangible computer-readable media, such as memory 124 or another memory, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. The computer-readable media may be selectively insertable and/or removable from computing device 122 to permit access and/or execution by processor 126. In an alternative implementation, the computer-readable media is not removable.

During operation, imaging system 118 performs a scan on pressing surface 112 to determine a current profile thereof. In some embodiments, imaging system 118 may be used to evaluate die 102 before first being entered into service. In such a scenario, the current profile determined by imaging system 118 is an original profile of pressing surface 112. The original profile may be stored within memory 124 of computing device 122, for example, and indexed as corresponding to the particular die 102 scanned. As such, in one embodiment, the original profile may be used as a baseline in future analyses of the particular die 102 performed by computing device 122.

For example, as shown in FIG. 2, the profile of pressing surface 112 may change throughout its service life, such as when pressing surface receives damage 114. In the exemplary embodiment, damage 114 may be defined by an indent within pressing surface 112, which may be caused by debris being introduced between dies 102 and 104 while stamping press 100 is in operation. Accordingly, damage 114 defines a repair site 128 on pressing surface 112 to be evaluated and/or repaired. The repair process may include adding repair material (i.e., a metallic material) to repair site 128 and/or mechanically removing material from repair site 128 in an effort to return pressing surface 112 to the desired profile.

In operation, imaging system 118 may perform a scan on pressing surface 112 after work is performed thereon. Computing device 122 may then compare the current profile determined from the scan to a desired profile of pressing surface 112, such as the original profile. The comparison analyzes the current profile and the desired profile to determine the presence of any dimensional variations therebetween, such as at repair site 128. Computing device 122 may then generate a repair template based on the dimensional variations, and projection system 120 may display the repair template on pressing surface 112. In an alternative embodiment, imaging system 118 performs a scan on pressing surface 112 before work is performed to facilitate identifying damage 114 thereon.

Figure 4:
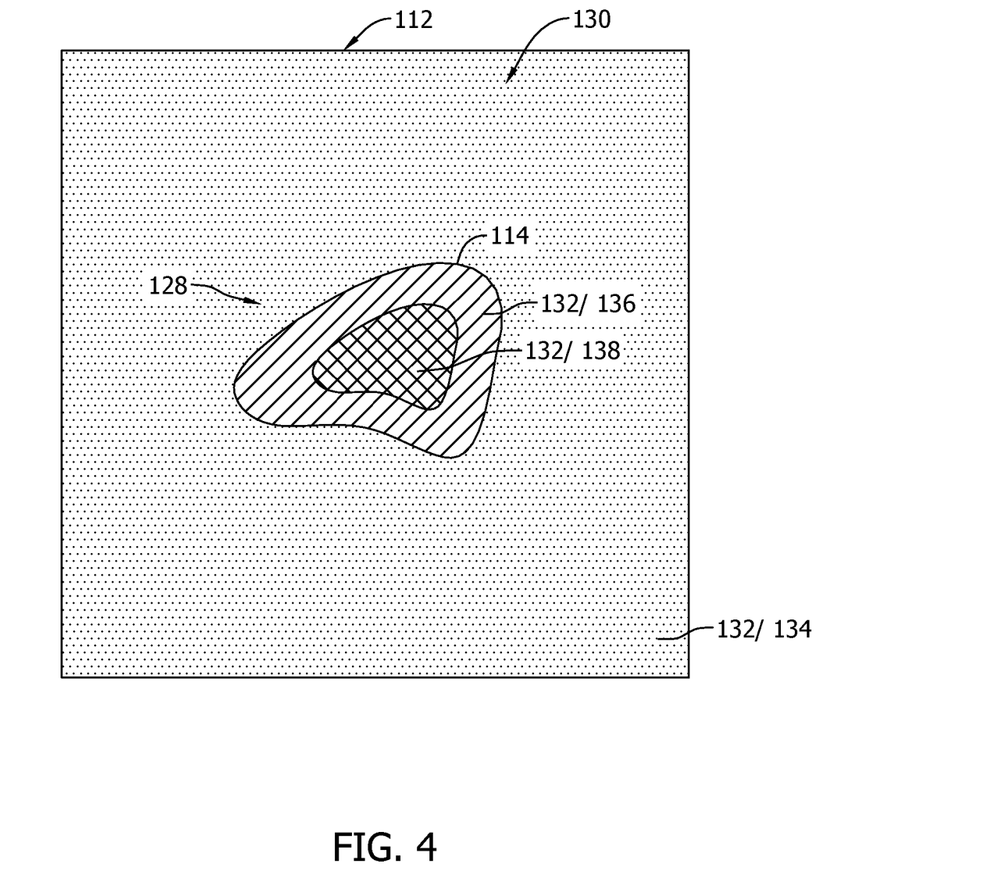
FIG. 4 illustrates an enlarged projection overlay view of the stamping press die shown in FIG. 3.
Figure 5:
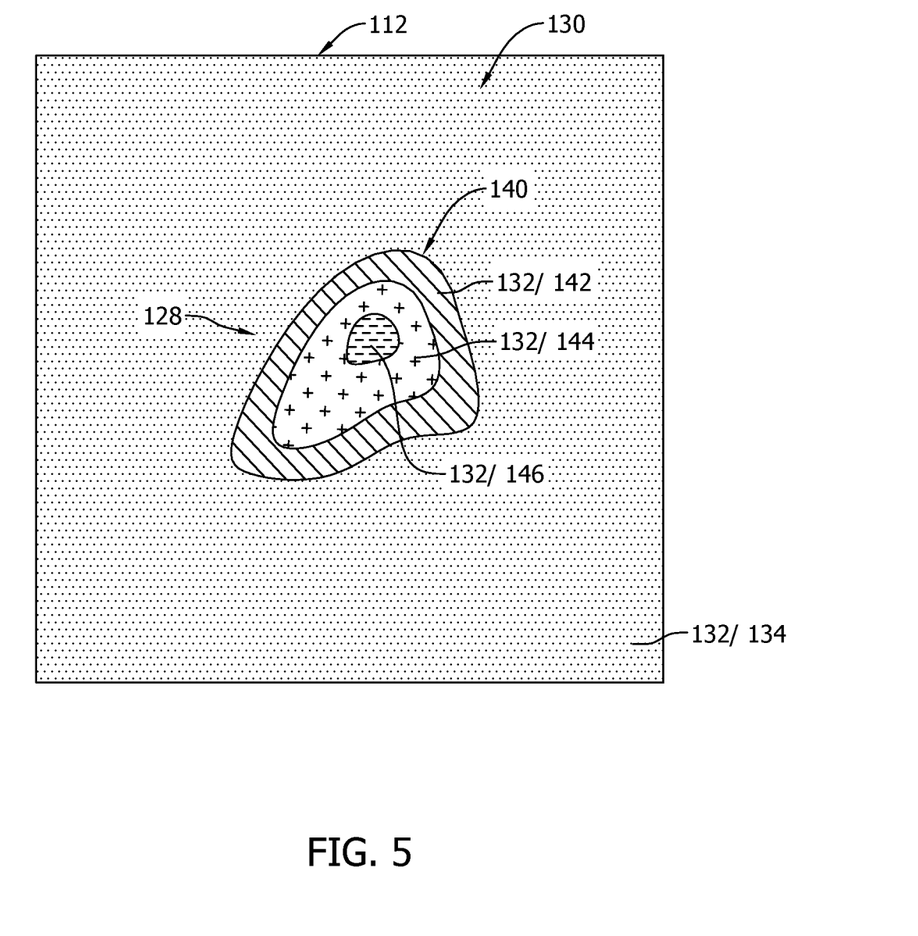
FIG. 5 illustrates an enlarged projection overlay view of the stamping press die shown in FIG. 3 after work has been performed thereon.
Figure 6:
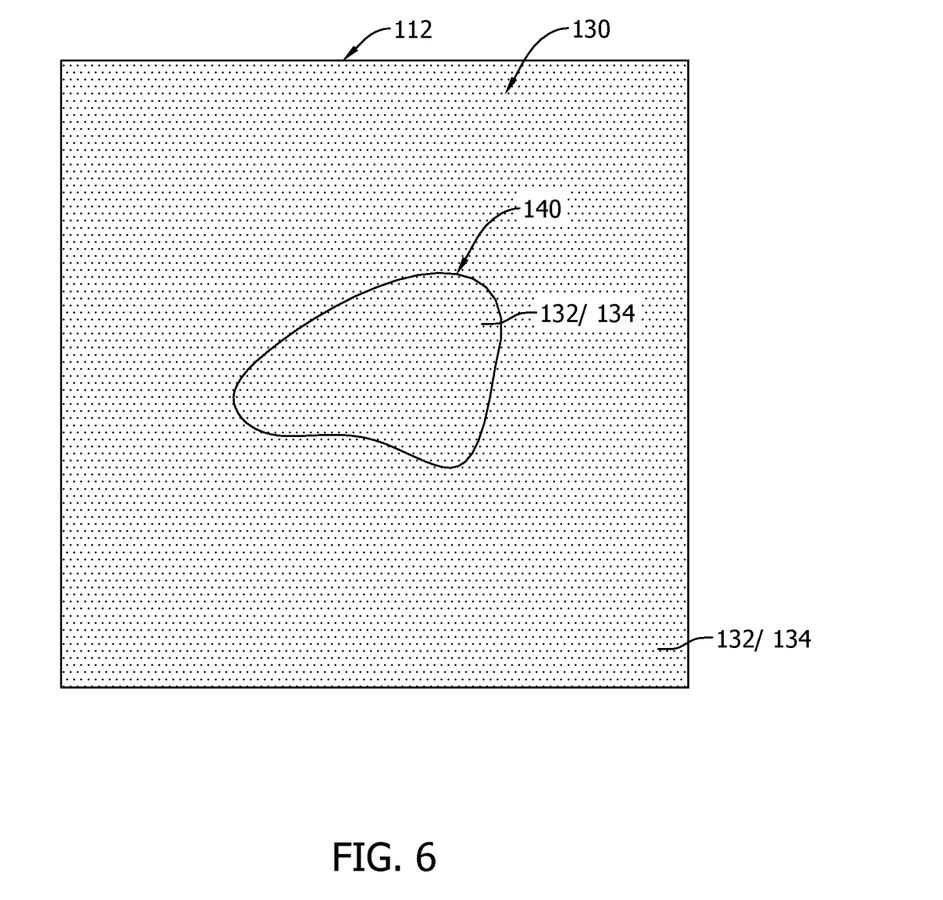
FIG. 6 illustrates an enlarged projection overlay view of the stamping press die shown in FIG. 3 after additional work has been performed thereon.

FIGS. 4-6 illustrate enlarged projection overlay views of stamping press die 102. Referring to FIG. 4, a repair template 130 is displayed on pressing surface 112, wherein repair template 130 is selectively defined from a plurality of visual cues 132. Each visual cue 132 may define a different respective dimensional variation in the determined current profile from the desired profile. For example, in the exemplary embodiment, repair template 130 is defined from a first visual cue 134 illustrated by a first distinct pattern, a second visual cue 136 illustrated by a second distinct pattern, and a third visual cue 138 illustrated by a third distinct pattern. In the exemplary embodiment, the distinct patterns represent different colors or shades of colors that may be projected onto pressing surface 112.

Defining repair template 130 using different visual cues 132 enables repair template 130 to be defined topographically based on the determined dimensional variations. For example, first visual cue 134 may define a dimensional variation in the determined profile that is less than a predefined tolerance (i.e., has an acceptable dimensional variation), and second and third visual cues 136, 138 may define respective dimensional variations in the determined profile that are greater than the predefined tolerance and/or defined within non-overlapping respective tolerance ranges. Accordingly, the degree in which different regions of damage 114 diverge from the desired profile are quantified topographically, and a technician may use the topographical visualization as a guide in determining how to repair damage 114.

Accordingly, FIGS. 4-6 illustrate repair templates 130 that may be generated at different times as work is performed at repair site 128. For example, FIG. 4 illustrates repair template 130 generated before work is performed on pressing surface 112. As described above, damage 114 is defined by an indent within pressing surface 112. In the exemplary embodiment, the distinct patterns associated with second visual cue 136 and third visual cue 138 define negative dimensional variations in the determined profile relative to the desired profile. Accordingly, the technician is provided with guidance that a material addition needs to be made at repair site 128 to bring determined profile into compliance with the desired profile. Visualizing the different distinct patterns also provides the technician with guidance that a greater material addition is needed at the location of third visual cue 138 than at second visual cue 136.

FIG. 5 illustrates repair template 130 generated after work has been performed on pressing surface 112 and after material has been added to pressing surface 112 at repair site 128 in the form of a patch 140. In the exemplary embodiment, repair template 130 is defined by first visual cue 134, a fourth visual cue 142, a fifth visual cue 144, and a sixth visual cue 146. Visual cues 142, 144, and 146 define respective dimensional variations in the determined profile that are greater than the predefined tolerance associated with first visual cue 134, and/or are defined within non-overlapping respective tolerance ranges. In addition, the distinct patterns associated with visual cues 142, 144, and 146 define positive dimensional variations in the determined profile relative to the desired profile. Accordingly, the technician is provided with guidance that a material reduction needs to be made at repair site 128 to bring determined profile into compliance with the desired profile.

FIG. 6 illustrates repair template 130 generated after additional work has been performed on pressing surface 112. In the exemplary embodiment, repair template 130 is defined uniformly by first visual cue 134, which indicates patch 140 is within the predefined tolerance. Accordingly, repair template 130 provides the technician with visual verification that the repair operation has been performed successfully.

In some embodiments, system 116 is operable to provide real-time feedback and guidance to the technician as work is performed. For example, imaging system 118 may perform additional scans after the current profile is determined, or may scan pressing surface 112 as work is performed at repair site 128. In such embodiments, computing device 122 updates repair template 130 based on modifications made to pressing surface 112 as the work is performed. The image displayed on pressing surface 112 by projection system 120 may be continuously updated to provide the real-time feedback and guidance to the technician. Accordingly, the views of FIGS. 4-6 may be illustrative of the feedback provided to the technician as a repair operation is performed. Scanning of pressing surface 112 and updating of repair template 130 may be repeated until compliance relative to the desired profile is achieved, as illustrated in FIG. 6.

The embodiments described herein relate to a repair system that compares a current topography of a component to be repaired to a desired topography. An overlay image may be projected onto the surface of the component to enable differences between the current topography and the desired topography to be visualized. In some embodiments, the projected image may be updated in real time as work is performed on the component. Accordingly, a technician performing the work may be provided with visual feedback and guidance for performing the work in an accurate and precise manner. The system also provides instant verification of a successful repair, and enables the stamping die to be returned to service quickly without the need for secondary verification techniques.

Exemplary embodiments of a repair system are described above in detail. Although the repair system is described and illustrated in association with a stamping press die, the invention is also intended for use in facilitating the repair of other mechanical devices as well. Moreover, it should also be noted that the components of the invention are not limited to the specific embodiments described herein, but rather, aspects of each component may be utilized independently and separately from other components and methods described herein.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in repairing a stamping press die, the system comprising:
   an imaging system configured to perform a scan on a pressing surface of the stamping press die, wherein a profile of the pressing surface is determined based on the scan;
   a computing device configured to:
      compare the determined profile to a desired profile of the pressing surface; and generate a repair template based on dimensional variations between the determined profile and the desired profile; and a projection system configured to display the repair template on the pressing surface.

2. The system in accordance with claim 1, wherein the imaging system is configured to perform additional scans on the pressing surface as work is performed on the pressing surface, and wherein the computing device is configured to update the repair template based on the additional scans.

3. The system in accordance with claim 1, wherein the imaging system is further configured to scan the pressing surface to determine an original profile of the pressing surface, and wherein the computing device is further configured to define the original profile as the desired profile.

4. The system in accordance with claim 1, wherein the computing device is further configured to selectively define the repair template from a plurality of visual cues, wherein each visual cue defines a respective dimensional variation in the determined profile from the desired profile.

5. The system in accordance with claim 1, wherein the computing device is further configured to selectively define the repair template from a plurality of visual cues including at least a first visual cue and a second visual cue that is different from the first visual cue, wherein the first visual cue defines a dimensional variation in the determined profile that is less than a predefined tolerance, and the second visual cue defines a dimensional variation in the determined profile that is greater than the predefined tolerance.

6. The system in accordance with claim 1, wherein the computing device is further configured to selectively define the repair template from a plurality of visual cues including at least a first visual cue and a second visual cue that is different from the first visual cue, wherein the first visual cue defines a positive dimensional variation, and the second visual cue defines a negative dimensional variation, in the determined profile relative to the desired profile.

7. The system in accordance with claim 1, wherein the imaging system comprises a time-of-flight camera sensor.

8. A system for use in repairing a stamping press die, the system comprising:

an imaging system configured to scan a pressing surface of the stamping press die as work is performed on the pressing surface, wherein a profile of the pressing surface is determined based on the scan;

a computing device configured to:
compare the determined profile to a desired profile of the pressing surface;
generate a repair template based on dimensional variations at the repair site between the determined profile and the desired profile; and
update the repair template based on modifications made to the pressing surface as the work is performed; and a projection system configured to display the repair template on the pressing surface.

9. The system in accordance with claim 8, wherein the computing device is further configured to update the repair template in real-time.

10. The system in accordance with claim 8, wherein the imaging system is further configured to scan the pressing surface to determine an original profile of the pressing surface, and wherein the computing device is further configured to define the original profile as the desired profile.

11. The system in accordance with claim 8, wherein the computing device is further configured to selectively define the repair template from a plurality of visual cues, wherein each visual cue defines a respective dimensional variation in the determined profile from the desired profile.

12. The system in accordance with claim 8, wherein the computing device is further configured to selectively define the repair template from a plurality of visual cues including at least a first visual cue and a second visual cue that is different from the first visual cue, wherein the first visual cue defines a dimensional variation in the determined profile that is less than a predefined tolerance, and the second visual cue defines a dimensional variation in the determined profile that is greater than the predefined tolerance.

13. The system in accordance with claim 8, wherein the computing device is further configured to selectively define the repair template from a plurality of visual cues including at least a first visual cue and a second visual cue that is different from the first visual cue, wherein the first visual cue defines a positive dimensional variation, and the second visual cue defines a negative dimensional variation, in the determined profile relative to the desired profile.

14. The system in accordance with claim 8, wherein the imaging system comprises a time-of-flight camera sensor.

15. A method of repairing a stamping press die, the method comprising:

performing a scan on a pressing surface of the stamping press die, wherein a profile of the pressing surface is determined based on the scan;

comparing the determined profile to a desired profile of the pressing surface;

generating a repair template based on dimensional variations between the determined profile and the desired profile; and displaying the repair template on the pressing surface.

16. The method in accordance with claim 15 further comprising performing additional scans on the pressing surface as work is performed on the pressing surface, and updating the repair template based on the additional scans.

17. The method in accordance with claim 15 further comprising:
scanning the pressing surface to determine an original profile of the pressing surface; and
defining the original profile as the desired profile.

18. The method in accordance with claim 15, wherein generating a repair template comprises selectively defining the repair template from a plurality of visual cues, wherein each visual cue defines a respective dimensional variation in the determined profile from the desired profile.

19. The method in accordance with claim 15, wherein generating a repair template comprises selectively defining the repair template from a plurality of visual cues including at least a first visual cue and a second visual cue that is different from the first visual cue, wherein the first visual cue defines a dimensional variation in the determined profile that is less than a predefined tolerance, and the second visual cue defines a dimensional variation in the determined profile that is greater than the predefined tolerance.

20. The method in accordance with claim 15, wherein generating a repair template comprises selectively defining the repair template from a plurality of visual cues including at least a first visual cue and a second visual cue that is different from the first visual cue, wherein the first visual cue defines a positive dimensional variation, and the second visual cue defines a negative dimensional variation, in the determined profile relative to the desired profile.

* * * * *